(12) United States Patent
Arnett

(10) Patent No.: US 6,860,335 B2
(45) Date of Patent: Mar. 1, 2005

(54) FRONT FOLDING AGRICULTURAL IMPLEMENT

(75) Inventor: Gregory W. Arnett, Solomon, KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 0 days.

(21) Appl. No.: 10/324,470

(22) Filed: Dec. 19, 2002

(65) Prior Publication Data

US 2004/0149464 A1 Aug. 5, 2004

(51) Int. Cl.⁷ .............................................. A01B 73/06
(52) U.S. Cl. .................... 172/311; 172/456; 172/459; 111/57
(58) Field of Search .............................. 172/311, 310, 172/446, 456, 459; 111/57

(56) References Cited

U.S. PATENT DOCUMENTS

| | | | |
|---|---|---|---|
| 4,171,022 A | 10/1979 | Applequist | |
| 4,211,288 A | 7/1980 | Applequist | |
| 4,214,637 A | 7/1980 | Applequist | |
| 4,236,585 A | 12/1980 | Adee et al. | |
| 4,346,909 A | 8/1982 | Hundeby | |
| 4,496,004 A * | 1/1985 | Frase et al. | 172/311 |
| 4,504,076 A * | 3/1985 | Bedney | 172/311 |
| 4,573,309 A | 3/1986 | Patterson | |
| 4,660,651 A * | 4/1987 | Pfenninger et al. | 172/311 |
| 4,662,161 A | 5/1987 | Patterson | |
| 4,664,202 A | 5/1987 | Applequist et al. | |
| 5,062,489 A | 11/1991 | Adee | |
| 5,232,054 A | 8/1993 | Van Blaricon et al. | |
| 5,839,516 A * | 11/1998 | Arnold et al. | 172/456 |

* cited by examiner

*Primary Examiner*—Robert E. Pezzuto
*Assistant Examiner*—Alexandra K. Pechhold
(74) *Attorney, Agent, or Firm*—Hovey Williams LLP (57) ABSTRACT

A multiple section, front-folding implement has gauge wheel assemblies located on the front side of laterally extending beams of the sections during field operations. As the wing sections are folded forwardly to prepare the machine for transport, the gauge wheel assemblies are simultaneously swung around to the ends of the beams into outboard positions so that they extend generally forwardly from the beams when the beams are fully folded. Thus, instead of taking up space between the folded beams, the gauge wheel assemblies are moved into clearance positions that enable the wing sections to be folded more closely together, reducing the overall roading width of the machine when folded.

15 Claims, 8 Drawing Sheets

FRONT FOLDING AGRICULTURAL IMPLEMENT

TECHNICAL FIELD

This invention relates to farm equipment such as planters and drills and, more particularly, to a way of folding such machines into a relatively narrow roading width.

BACKGROUND AND SUMMARY

It is known in the art to fold multiple section planters and drills forwardly from wide spread field positions to narrowed transport positions. However, in many multiple sections machines gauge wheels on the wing sections project forwardly from the front side of the sections and thus tend to interfere with one another when the sections are folded together. To avoid these interference problems, pivot points for the wing sections are typically spaced far enough apart to keep the gauge wheels from interfering with one another when the machine is in its folded condition. However, this necessarily increases the overall width of the folded machine.

The present invention solves this problem by making the gauge wheel assemblies shiftable from their positions on the front side of the wing sections into outboard positions at the ends of the sections during folding of the wings into their folded positions. This clears out the space otherwise occupied by the gauge wheels on the front side of the wing sections and allows the wing sections to come closer together in the folded position, resulting in a reduced overall width of the machine.

The ground engaging wheel of each gauge wheel assembly comprises a self-aligning castor wheel that reacts to ground forces during the folding and unfolding sequence so as to reorient itself with the path of travel of the machine. A positive, hydraulic-operated latch locks the castor wheels in straight-ahead positions during field operations, and a spring-loaded detent yieldably maintains the castor wheels in straight-ahead positions during over-the-road travel. The gauge wheel assemblies are shifted between their inboard and outboard positions by hydraulic cylinders that are coupled in master-slave relationship with fold cylinders for the wing sections, so that folding of the wing sections and repositioning of the gauge wheels occur simultaneously. Instead of a long central tongue, the machine utilizes a pair of pull bars that are coupled at their rear ends to the wing sections and converge forwardly to a common hitch member that is connected to the towing tractor. Ball swivels at the rear ends of the pull bars allow for independent flexing of the wing sections as uneven terrain is encountered.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The implement 10 disclosed herein for purposes of illustration comprises a three section seeding machine, although almost all the openers of such machine have been removed to simplify the drawings and promote an understanding of the principles of the invention. As will be apparent, the principles of the present invention are applicable to many different types of folding implements and are not limited to machines having three sections. Some of the principles of the invention are applicable to rear folding machines as well as front folding machines.

In the illustrated embodiment the three section implement 10 includes a center section 12 and two wing sections 14 and 16 on opposite sides of center section 12. Center section 12 includes a wheeled carriage or frame 18 having a front axle assembly 20 and a rear axle assembly 22. Front axle assembly 20 has a pair of hydraulic cylinders 22 that regulate the height of the front of frame 18, while rear axle assembly 22 has hydraulic cylinders (not shown) that regulate the height of the rear of frame 18. As illustrated particularly in FIG. 3, rear axle assembly 22 is mounted to the frame 18 via a fore-and-aft trunnion 28 so that rear axle assembly 22 can swivel about a fore-and-aft axis to accommodate changes in ground contour experienced by wheels 30 and 32 of axle assembly 22. Front axle 20 is not pivotal side-to-side and remains level with the frame 18 as wheels 34 and 36 of front axle assembly 20 engage the ground. A seed box 38 (only partially shown) mounted on frame 18 is adapted to supply seeds to openers carried on a single transverse tool beam 40 across the front of frame 18 (see FIG. 2). Opener assemblies are secured to tool beam 40 along the length thereof as represented by the opener assembly 42 in FIG. 3. It will be appreciated that opener assemblies similar to opener 42 are also provided for wing sections 14 and 16.

Figure 1:
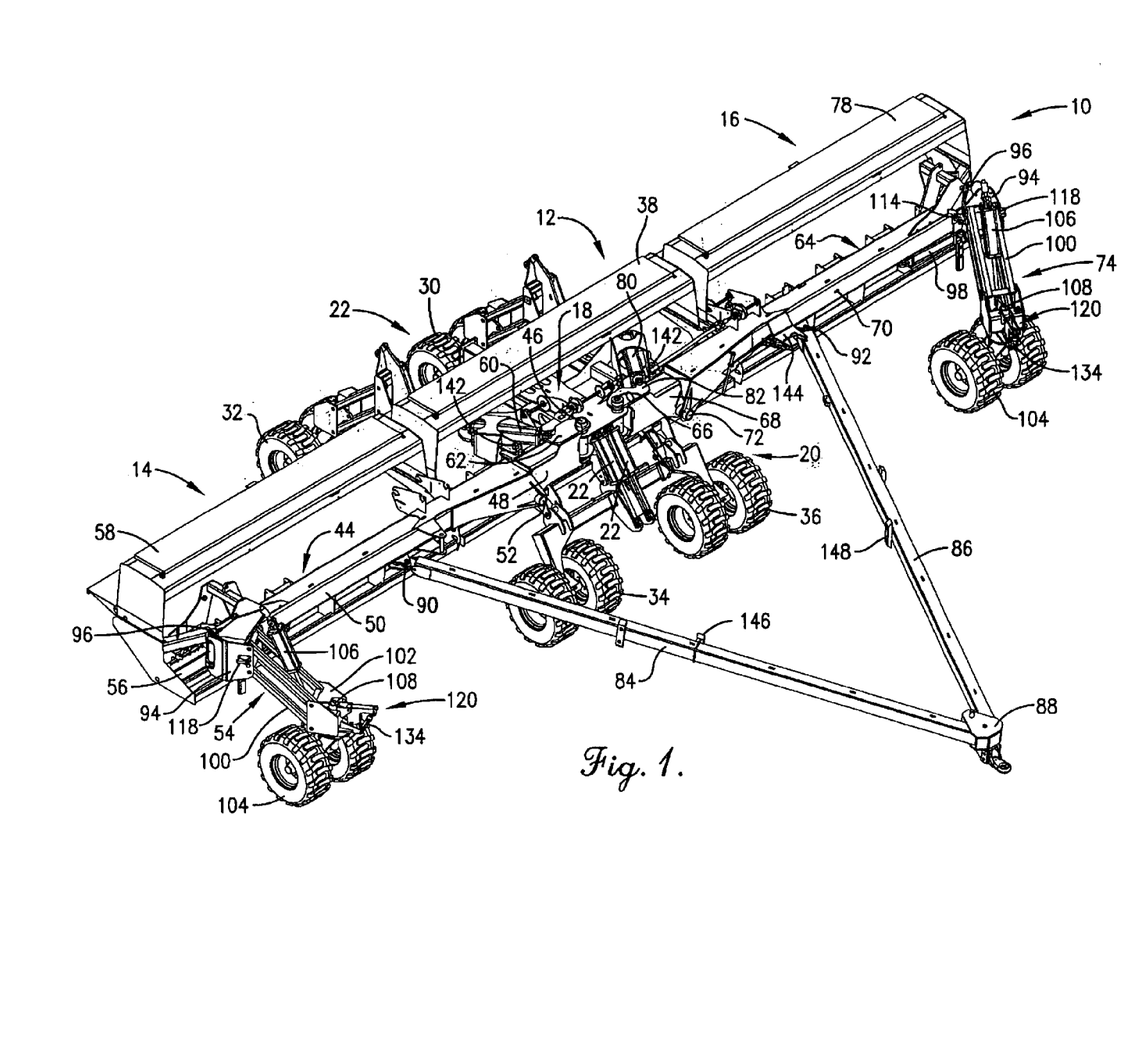
FIG. 1 is a right, front, top isometric view of a machine constructed in accordance with the principles of the present invention, the machine being illustrated with its wing sections in their field positions.

With reference to FIG. 1, wing section 14 includes a transversely extending beam 44 that is connected at its inner end to frame 18 via an upright pivot 46 for horizontal swinging movement. Beam 44 includes a relatively short inboard section 48 and a much longer outboard section 50 that is coupled with inboard section 48 via a horizontal, normally fore-and-aft extending pivot 52. As will be seen, pivot 52 enables wing section 14 to swing up and down relative to center section 12 during field operations. A gauge wheel assembly 54 is mounted on beam 44 adjacent the outer end of section 50 for supporting wing section 14 for over-the-ground travel. A horizontal tool bar 56 is fixed to section 50 of beam 44 below and rearwardly thereof for the purpose of supporting a line of openers (not shown) on the wing section. A seed box 58 (partially shown) is affixed to tool bar 56 for supplying seeds to the openers situated below it. A horizontally disposed swing cylinder 60 adjacent in the inner end of beam 44 connects a fixed crank 62 on inner beam section 48 with frame 18 for the purpose of effecting fore-and-aft folding and unfolding swinging movement of wing section 14.

Figure 3:
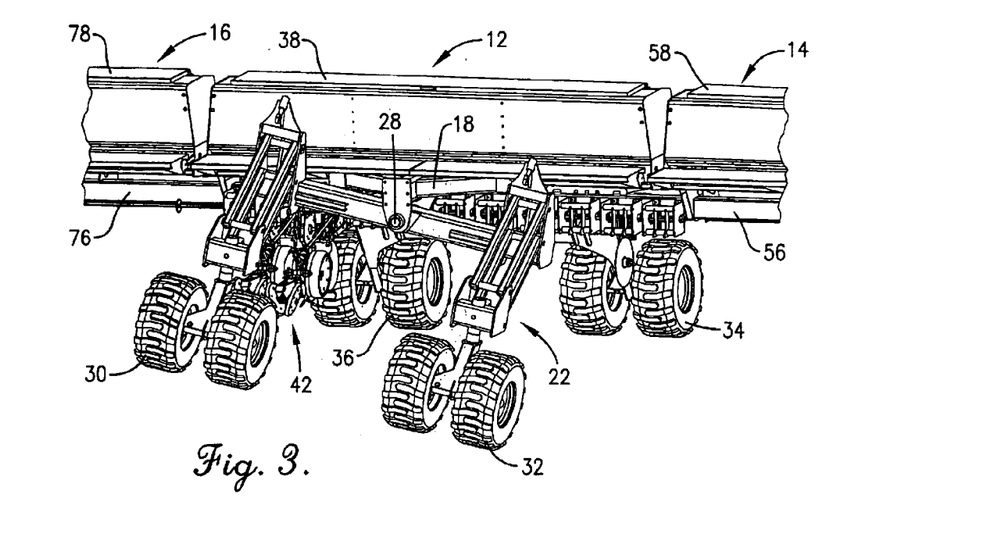
FIG. 3 is a right, rear, fragmentary isometric view of the machine illustrating the way in which the rear axle can pivot about a fore-and-aft axis to compensate for field irregularities.

The opposite wing section 16 is similar to wing section 14 and includes a horizontal beam 64 that is connected at its inboard end to frame 18 via an upright pivot 66 located slightly to the left of pivot 46 as viewed from the rear of the machine. Beam 64 includes a short inboard section 68 carried by pivot 66 and a much longer outboard section 70 connected to inboard section 68 by a horizontal, normally fore-and-aft extending pivot 72 for up and down swinging movement of outboard section 70. A gauge wheel assembly 74 adjacent the outer end of beam 64 is mounted on outboard section 70 to support beam 64 during both field operations and over-the-road travel. A tool bar 76 shown best in FIG. 3 is fixed to outer beam section 70 and extends parallel thereto in somewhat downwardly and rearwardly spaced relationship therewith for supporting a series of openers (not shown). A seed box 78 (partially shown) is affixed to tool bar 76 for supplying seeds to the underlying openers. A swing cylinder 80 connects a fixed crank 82 on inboard section 68 with the frame 18 for effecting powered fore-and-aft swinging movement of beam 64 during folding and unfolding operations.

With reference to FIG. 1, the three sections 12, 14 and 16 are pulled during field operations and road travel by a pair of pull bars 84 and 86 that connect at their rear ends to sections 14 and 16 respectively and converge forwardly to a common hitch member 88 that is adapted for coupling with a towing vehicle (not shown). Pull bars 84, 86 are pivoted at their front ends to hitch member 88 and are coupled at their rear ends to beam sections 50 and 70 of the beams 44 and 64 respectively. Rear couplings 90 and 92 of pull bars 84 and 86 are in the nature of ball swivels so that each of the pull bars 84, 86 can twist and cant to a limited extent relative to its corresponding wing section as may be necessary to accommodate changes in terrain experienced by wing sections 14 and 16 during operations.

Figure 2:
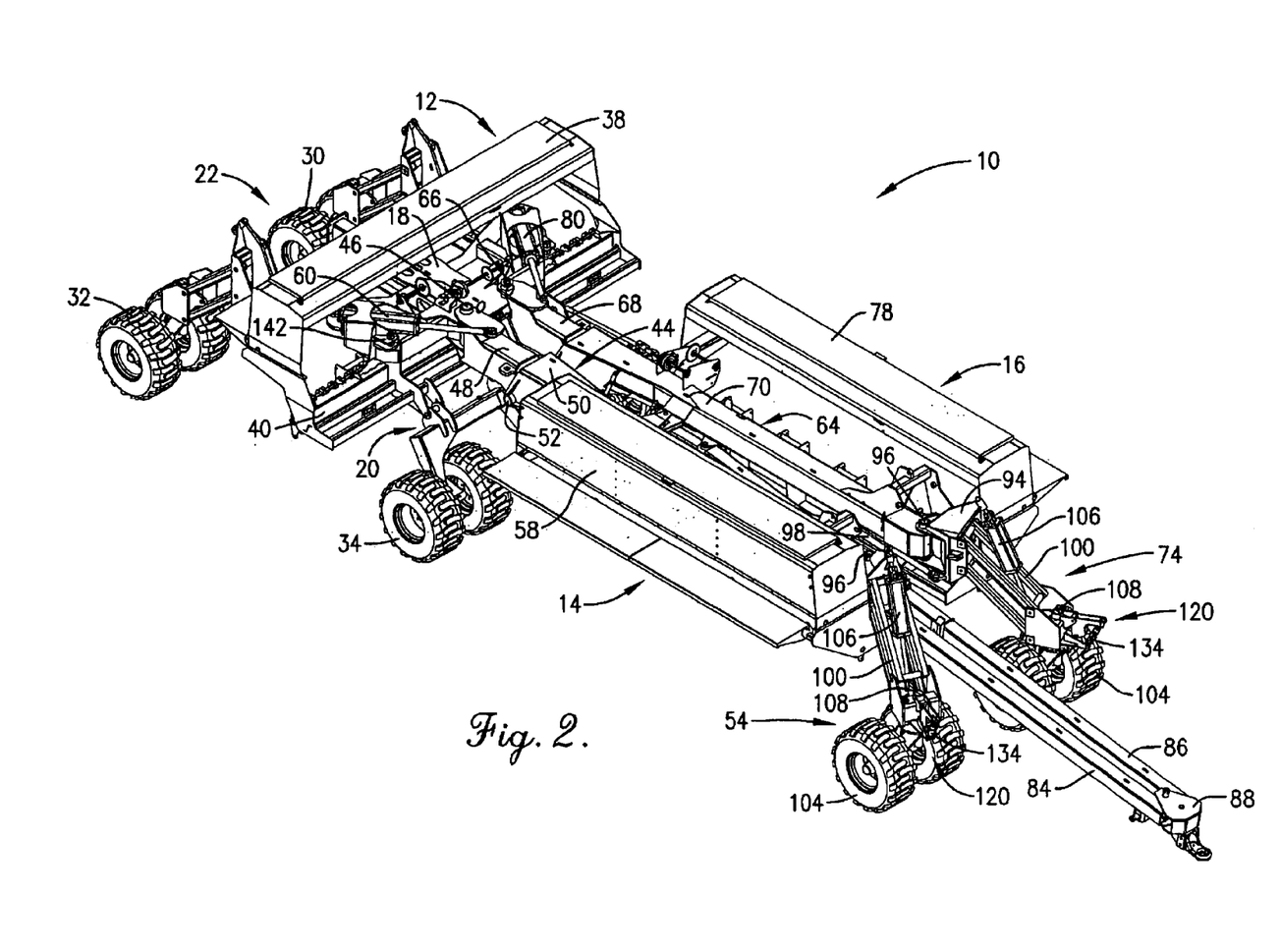
FIG. 2 is an isometric view similar to FIG. 1 but showing the wing sections folded forwardly into their folded positions for transport.

Each of the gauge wheel assemblies 54 and 74 includes a turret 94 at its upper end that is connected to the outer end of the corresponding beam section 50 or 70 by an upright pivot 96. A swing cylinder 98 connected between each turret 94 and the corresponding beam section 50 or 70 is operable to rotate turret 94 about the axis of pivot 96 for the purpose of shifting the gauge wheel assembly 54 or 74 between an inboard position as illustrated in FIG. 1 and an outboard position as illustrated in FIG. 2. Each gauge wheel assembly 54, 74 further includes a wheel arm 100 in the nature of a four-bar linkage connected at one end to turret 94 and at the other end to a bracket 102 that supports a ground wheel 104. In the illustrated embodiment, ground wheel 104 is in the nature of a set of dual wheels, although a single wheel could be utilized. A lift cylinder 106 comprises a further part of each gauge wheel assembly 54, 74 and is connected between turret 94 and bracket 102 for the purpose of raising and lowering wheel 104 to thus adjust the working depth of the openers carried by the machine or to place the machine in an elevated position for transport purposes.

Figure 4:
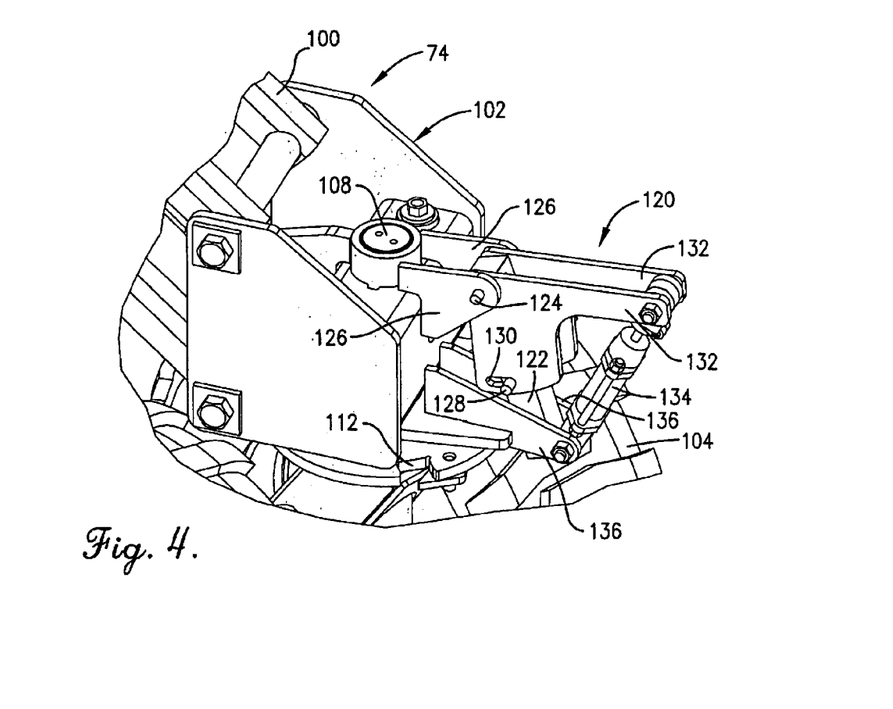
FIG. 4 is an enlarged, fragmentary isometric view of one of the gauge wheel assemblies associated with a wing section and illustrating details of the locking bar mechanism for releaseably holding the castor of the assembly in a straight-ahead position.
Figure 5:
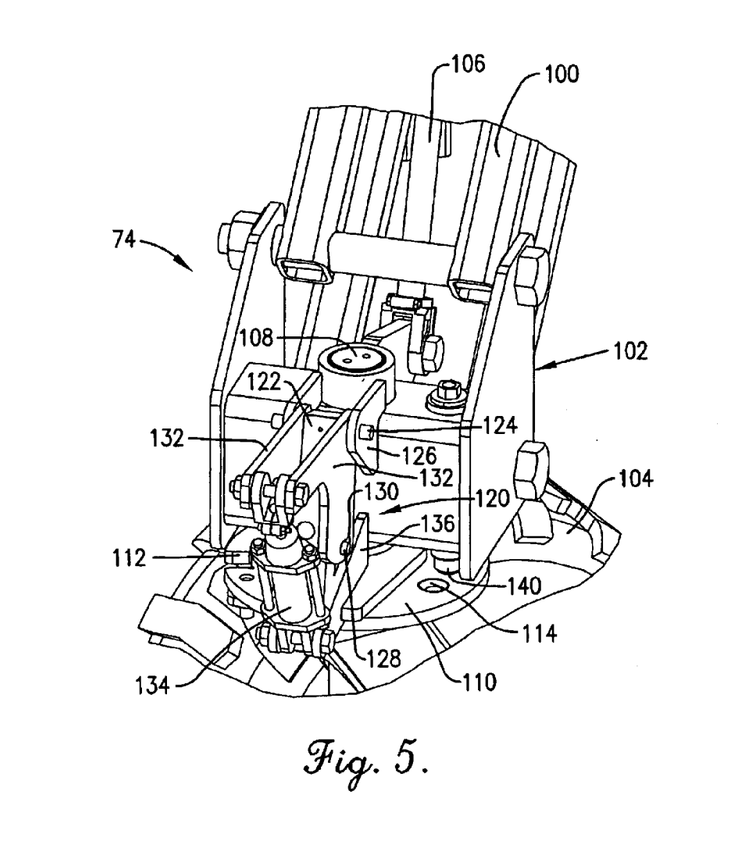
FIG. 5 is another enlarged, fragmentary isometric view of the gauge wheel assembly illustrating other details of construction of the locking bar mechanism.

Each of the wheels 104 is in the nature of a castor wheel that responds to ground forces so as to cause the wheel to self-align with the direction of travel of the machine. To this end, each castor wheel 104 includes an upright pivot 108 defining an axis about which wheel 104 swivels during self-aligning action. Each pivot 108 is journaled by the bracket 102, and a circular, horizontally disposed plate 110 is fixed to pivot 108 below bracket 102 for rotation with wheel 104 and pivot 108 during the self-aligning action. Circular plate 110 has a notch 112 in its outer periphery as illustrated in FIGS. 4, 5, 7 and 8, for a purpose to be subsequently described, and also has a beveled hole 114 as shown in FIG. 5 whose purpose will also be subsequently described.

Figure 6:
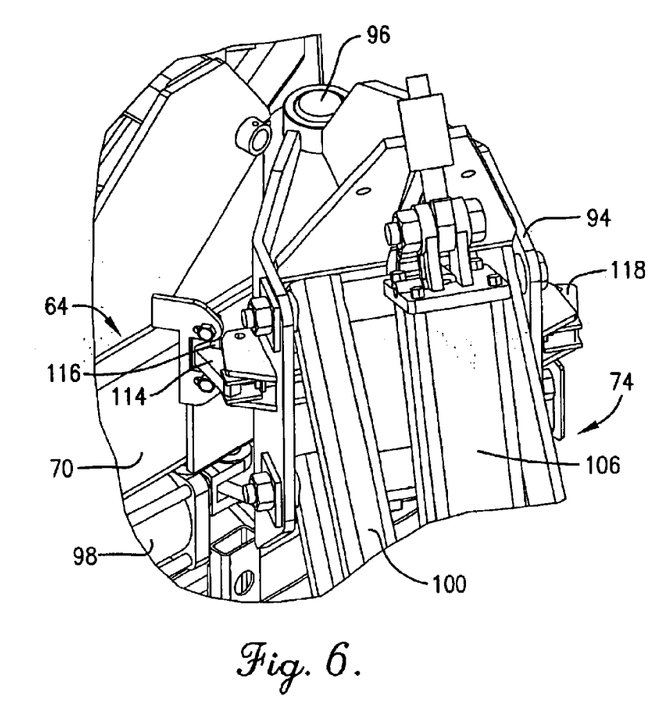
FIG. 6 is an enlarged, fragmentary isometric view of one of the gauge wheel assemblies illustrating the locks that releaseably retain the assemblies in their inboard and outboard positions.
Figure 7:
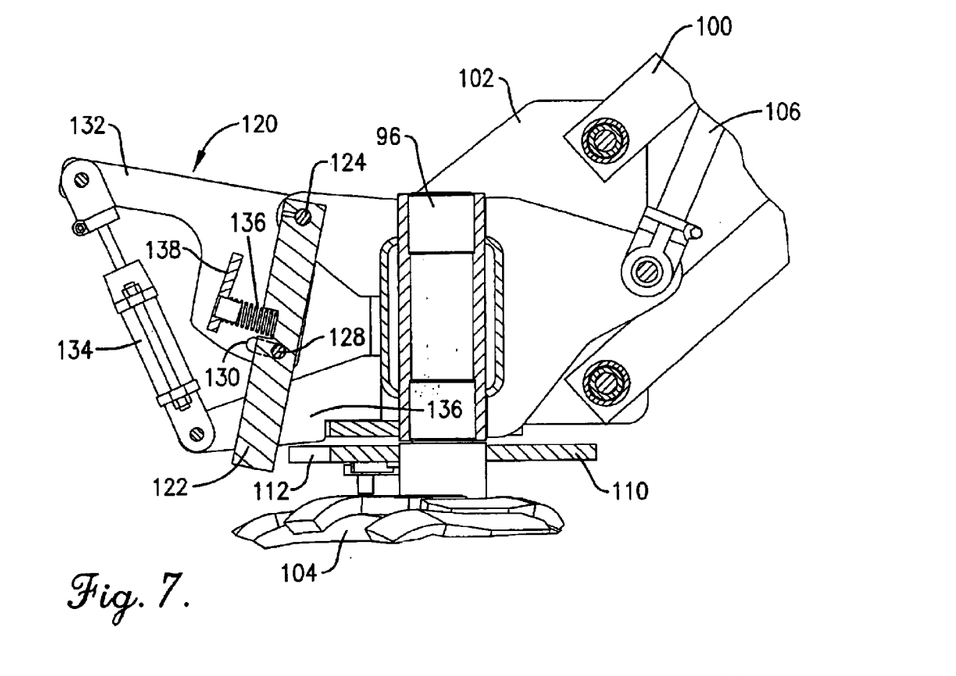
FIG. 7 is an enlarged, fragmentary cross sectional view through one of the gauge wheel assemblies illustrating further details of construction of the locking bar mechanism for retaining the castor wheel in its straight-ahead position, the bar being shown in its released condition.
Figure 8:
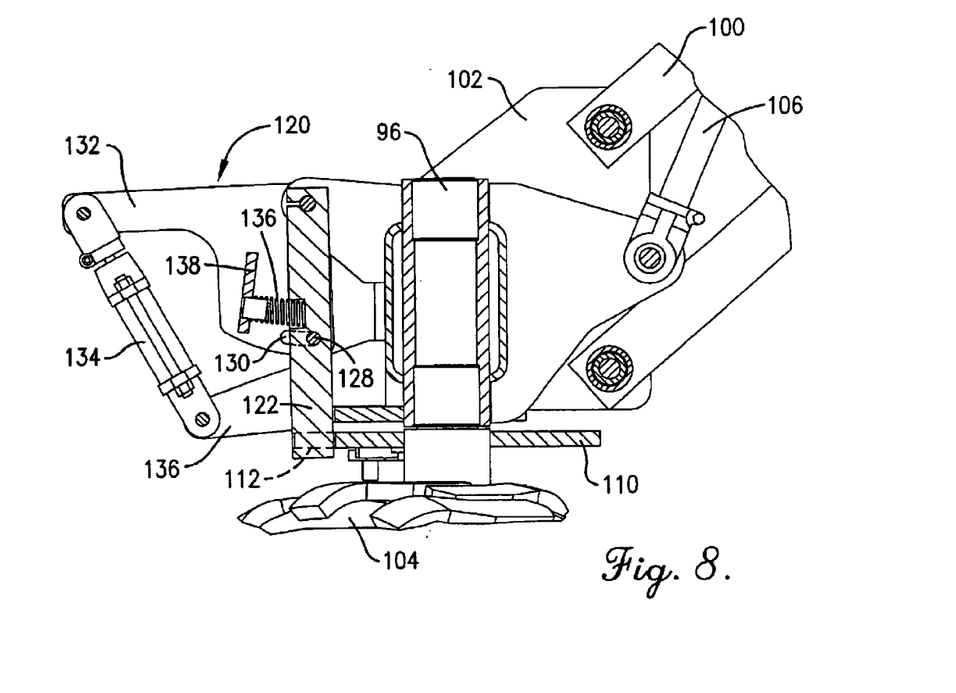
FIG. 8 is an isometric view similar to FIG. 7 but showing the locking bar in its locked position.
Figure 9:
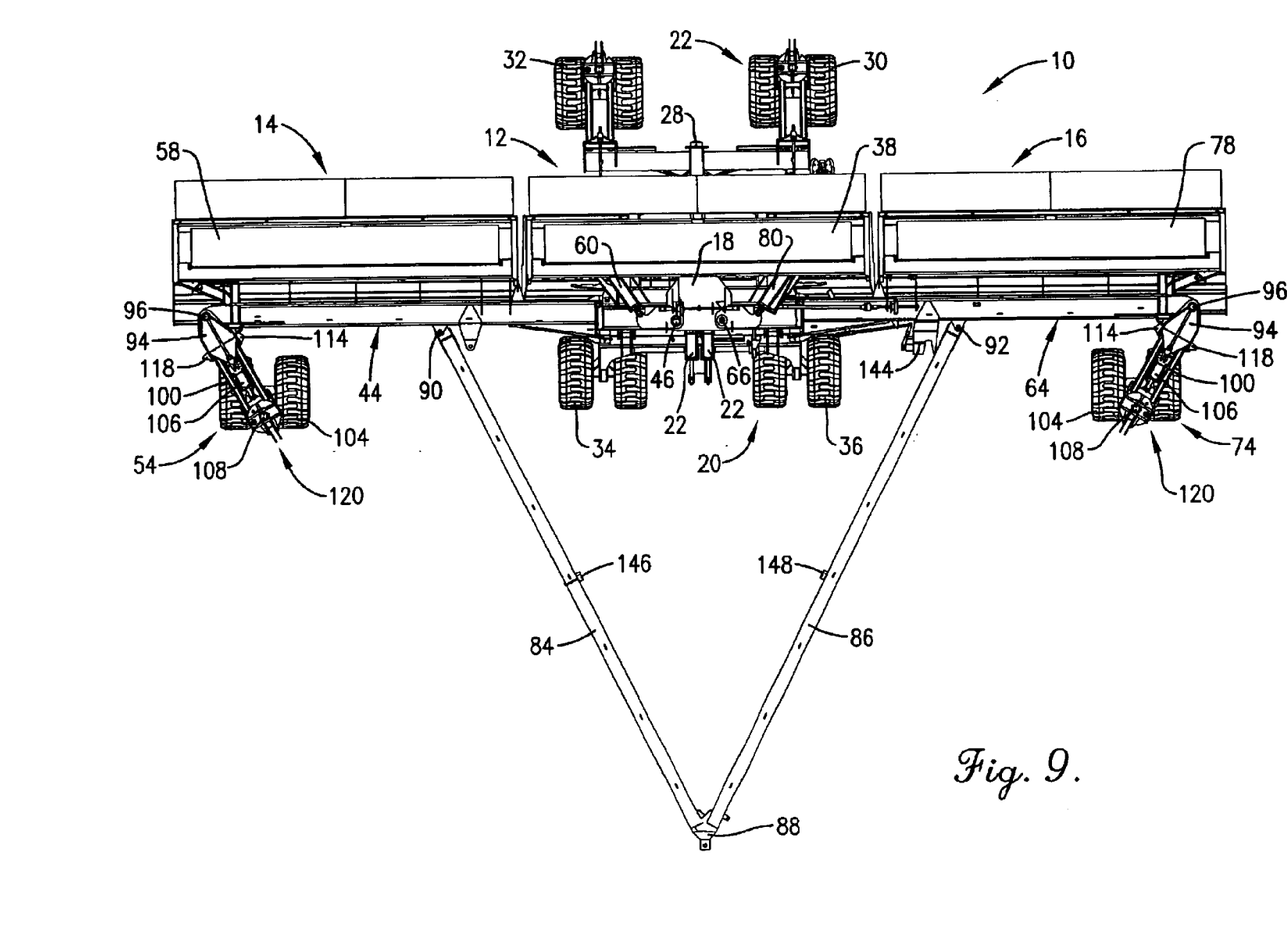
FIG. 9 is a top plan view of the overall machine with the wing sections in their field positions.
Figure 11:
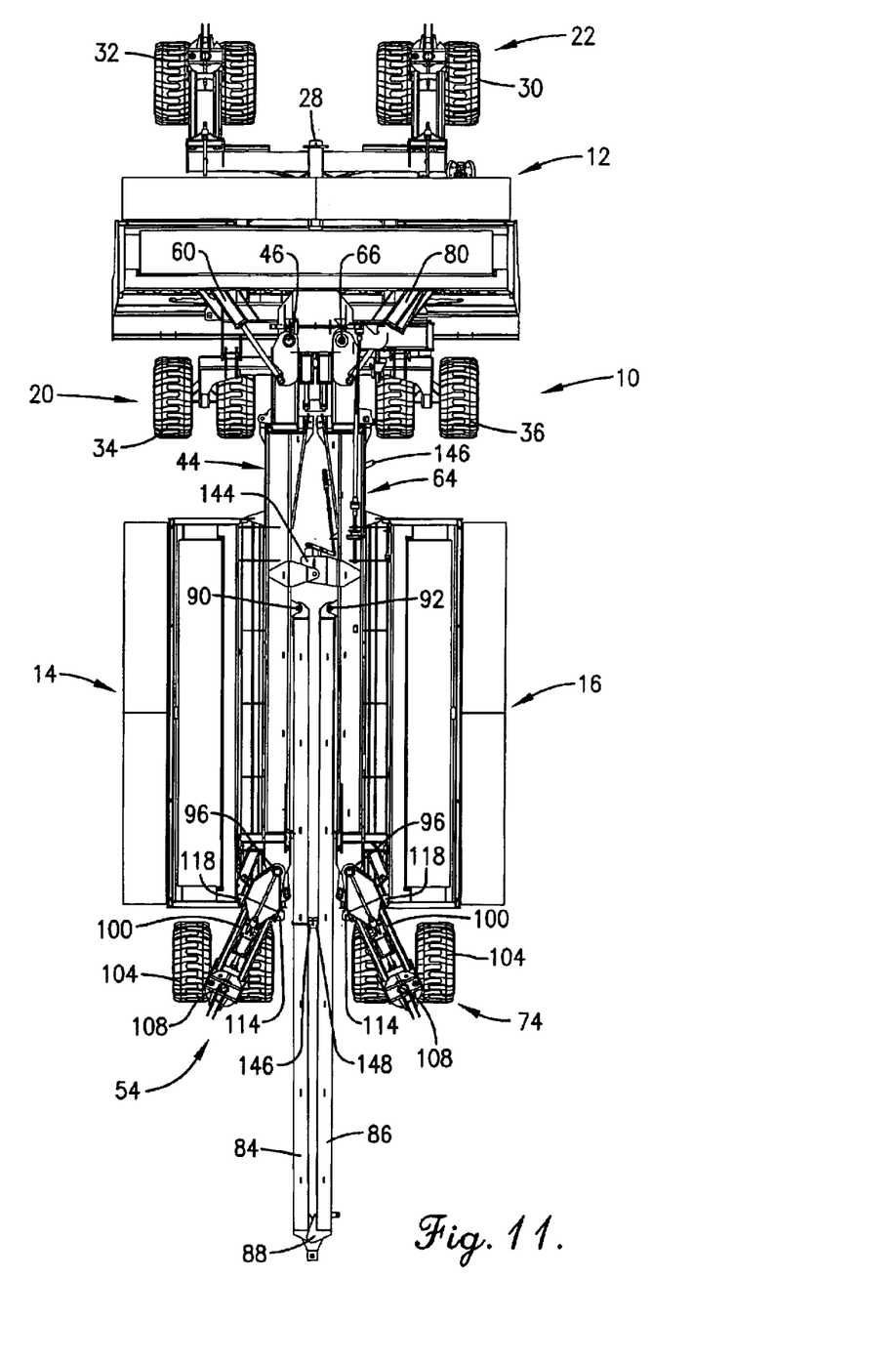
FIG. 11 is a top plan view of the machine showing the wing sections completely folded into their folded positions for transport.

When the machine is in its field operating mode as illustrated in FIGS. 1 and 9, gauge wheel assemblies 54 and 74 are preferably mechanically retained in their inboard positions on the front side of beams 44 and 64 as illustrated in those figures. Preferably, wheels 104 of gauge wheel assemblies 54 and 74 are also releaseably mechanically locked in their straight-ahead positions as illustrated in those figures. To this end, as illustrated in FIG. 6, each gauge wheel assembly is provided with a manual latch 114 on the turret 94 that can be engaged with a catch 116 on the adjacent beam 44 or 64 when the gauge wheel assembly is in its inboard position. On the opposite side of each turret 94, a similar latch 118 is provided for manual engagement with a corresponding catch (not shown) on the outer end of the corresponding beam for retaining the gauge wheel assembly in its outboard position for transport as illustrated in FIGS. 2 and 11 for example. As will be appreciated by those skilled in the art, the latches and catches 114–118 may take a variety of different forms.

In order to lock each castor wheel 104 in a -ahead position during field operations, each gauge wheel assembly 54, 74 is provided with a locking mechanism broadly denoted by the numeral 120 and mounted on the bracket 102 at the lower end of wheel arm 100. As shown in detail in FIGS. 4, 5, 7 and 8, each locking mechanism 120 includes as a primary component a locking bar 122 that is adapted to be matingly received within the notch 112 in the edge of plate 110 when wheel 104 is at the proper angle with respect to wheel arm 100. In FIGS. 4 and 5, wheel 104 is in such a rotative position relative to wheel arm 100 that notch 112 is not in position to receive locking bar 122, but when wheel 104 is in a position as illustrated in FIG. 9 relative to arm 100, notch 112 will be lined up with locking bar 122 and the bar will be received within notch 112 to prevent rotation of wheel 104 relative to arm 100.

In order to carry out this function, locking bar 122 is secured at its upper end by a transverse pivot 124 to a pair of forwardly projecting mounting lugs 126 on bracket 102. Locking bar 122 is thus swingable toward and away from the peripheral edge of circular plate 110 as may be seen by comparing the positions of locking bar 122 in FIGS. 7 and 8. A pair of short pins 128 project laterally from locking bar 122 intermediate its opposite ends and are received within respective arcuate slots 130 in a pair of generally L-shaped, laterally spaced apart crank plates 132. The crank plates 132 are attached to the lugs 126 by the same pivot 124 that pivotally mounts locking bar 122 to lugs 126. A hydraulic cylinder 134 is connected between the outer ends of crank plates 132 and a pair of mounting ears 136 on bracket 102 for the purpose of operating crank plates 132 to lock and unlock locking bar 122.

Notch 112 is not always in registration with locking bar 122 when cylinder 134 is actuated to swing bar 122 inwardly toward the periphery of circular plate 110. At those times, bar 122 will simply engage the edge of plate 110 and rest in that position due to the pin and slot connection between bar 122 and crank plates 132 afforded by pins 128 and slots 130. However, to assure that bar 122 snaps into notch 112 when those two components are properly aligned, a relief spring 136 is provided on a cross member 138 between crank plates 132 that yieldably biases locking bar 122 radially inwardly toward plate 110.

It is also desirable to have the castor wheels 104 maintained in a straight-ahead position aligned with the path of travel of the machine when wing sections 14 and 16 are in their folded positions as illustrated in FIGS. 2 and 11. To this end, the beveled hole 114 in plate 110 is so located that when wheel 104 is in its angled position relative to arm 100 as illustrated in FIG. 11, hole 114 will be in registration with a spring-loaded detent pin 140 projecting downwardly from bracket 102. When engaged within hole 114, detent pin 140 is capable of retaining wheel 104 in its straight-ahead position relative to arm 100 as illustrated in FIG. 11 during normal roading conditions. However, the spring (not shown) associated with pin 140 is of such strength that when wing sections 14 and 16 are swung out from their folded positions of FIG. 11 toward their field positions of FIG. 9, the ground forces operating against wheels 104 are able to overcome the spring force associated with detent pin 140 and swivel the wheels 104. During such action, detent pin 140 merely bears against the top surface of plate 110 and remains in that relationship until the fully folded position of FIG. 11 is once again obtained.

OPERATION

During field operations the implement 10 is in its widespread condition as illustrated in FIGS. 1 and 9 wherein wing sections 14 and 16 project laterally outwardly from center section 12 in aligned relationship therewith. In a preferred embodiment, manually releaseable locks of any suitable design, such as locks 142 (FIGS. 1 and 2) between frame 18 and inboard sections 48 and 68 of beams 44 and 64 respectively, are used to maintain beams 44 and 64 in their field positions. Thus, when the tractor moves forwardly to impose a draft force on pull bars 84 and 86, tool beams 44 and 64 do not fold forwardly but instead transfer a portion of such draft force to center section 12 such that the entire machine 10 advances. As variations in ground contour are encountered, the three sections can flex relative to one another about fore-and-aft pivots 52 and 72, and the ball swivels 90 and 92 at the rear of pull bars 84 and 86 accommodate such floating action notwithstanding the fact that pull bars 84 and 86 remain essentially in the same horizontal plane at all times.

When wing sections 14 and 16 are in their field positions, gauge wheel assemblies 54 and 74 are disposed in their inboard or inwardly swung positions on the front side of beams 44 and 64 so as to place wheels 104 in the best position to sense changes in ground contour for the openers of the sections. It will be noted that wheels 104 are generally axially aligned with wheels 34 and 36 of center section 12 at this time, which facilitates turn around at the end of the field and otherwise.

When the wing sections 14 and 16 are in their field operating positions, the gauge wheel assemblies 54 and 74 are latched in their inboard positions by the inboard latches 114. These take the load off swing cylinders 98, which would otherwise need to hold gauge wheel assemblies 54 and 74 in their proper positions. In a preferred embodiment, the latches 114 are manually latched and unlatched, although it is certainly within the principles of the present invention to have such latches remotely actuable by hydraulic cylinders or the like. Also at this time, locking bar mechanisms 120 are in their latched conditions of FIG. 8 so that castor wheels 104 are effectively locked in their straight-ahead positions generally in line with the path of travel of the machine.

When the operator desires to place the machine into its transport mode, all of the hydraulic cylinders for the various ground wheels are first extended to raise the tools completely out of the ground and into a position that provides good ground clearance. He then manually releases locks 142 for beams 44 and 64, and the latches 114 for the gauge wheel assemblies 54 and 74. By then extending the hydraulic cylinders 134 associated with locking bar mechanisms 120, castor wheels 104 of gauge wheel assemblies 54 and 74 are enabled to swivel in response to ground forces as the machine is folded into its folded condition.

Figure 10:
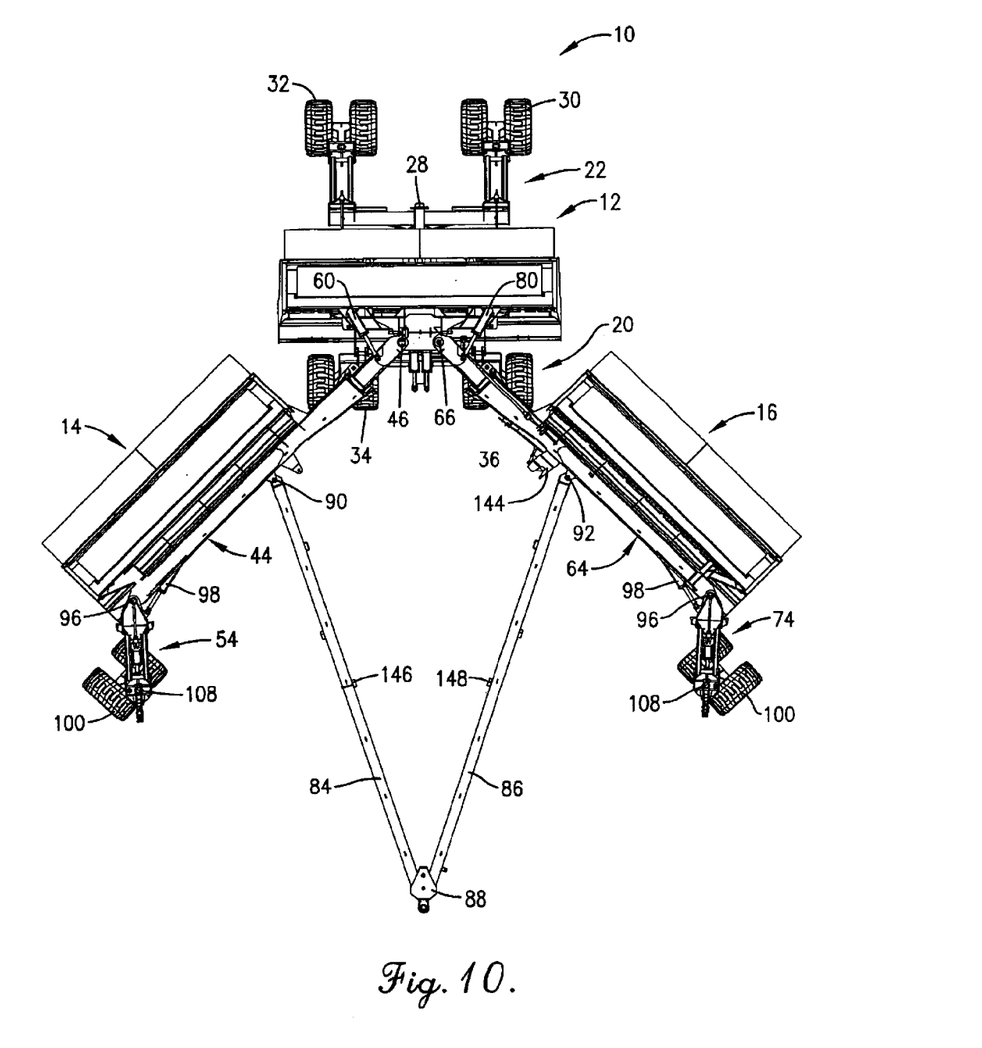
FIG. 10 is a top plan view of the machine with the wing sections partially folded.

To commence folding, swing cylinders 60 and 80 are extended, which simultaneously extends swing cylinders 98 for gauge wheel assemblies 54 and 74. In this regard, in a preferred embodiment the swing cylinder 60 is connected in master-slave relationship with the swing cylinder 98 of gauge wheel assembly 54, the cylinder 60 being the master and the cylinder 98 being the slave. Similarly, in a preferred embodiment, the swing cylinder 80 is the master of swing cylinder 98, although the two masters 60 and 80 are connected in parallel to one another. Thus, as wing sections 14 and 16 start to fold forwardly, the wheel arms 100 of gauge wheel assemblies 54 and 74 begin to swing toward their outboard positions, all as represented by the partially folded machine illustrated in FIG. 10. It will be appreciated that as wing sections 14 and 16 are swinging inwardly at this time, castor wheels 100 of gauge wheel assemblies 54 and 74 are reacting to ground forces and are swiveling about the axes of their pivots 108 to align themselves with the path of swinging travel of wing sections 14 and 16.

Once the machine has been fully folded as illustrated in FIGS. 2 and 11, wing sections 14 and 16, along with their beams 44 and 64, extend generally parallel to the path of travel of the machine in closely spaced relationship to one another on opposite sides of the collapsed pull bars 84 and 86. Gauge wheel assemblies 54 and 74 have arrived at their outboard positions projecting beyond the ends of their respective beams 44 and 64 and thus also project generally in the direction of travel of the machine. It will be recognized that wheel arms 100 swing through an arc that is somewhat less than 180° as they move from their inboard positions to their outboard positions and that, in their outboard positions, they project outwardly from the center line of the machine at an angle in the neighborhood of 30°. This places the castor wheels 100 further outboard of the center line of the machine than would be the case if arms 100 projected in axial alignment with the longitudinal axes of beams 44 and 64, thereby providing greater clearance between gauge wheel assemblies 54 and 74 without sacrificing the narrow spacing between beams 44 and 64 at this time.

Once wing sections 14, 16 have been fully folded and gauge wheel assemblies 54, 74 are in their proper outboard locations, the operator may manually latch outboard latches 118 of gauge wheel assemblies 54 and 74 to retain such assemblies in their outboard positions. In addition, he may manually lock a suitable latch 144 (FIG. 11) between beams 44 and 64 using a handle 146. Latch 144 thus retains wing sections 14 and 16 in their fully folded positions during over-the-road travel. Preferably, a pair of suitable bumpers 146 and 148 on the inside edges of pull bars 84 and 86 come into abutment with one another when pull bars 84, 86 are fully collapsed and lying alongside one another.

It is likely that when wing sections 14 and 16 have been fully folded into their folded positions, castor wheels 104 of gauge wheel assemblies 54 and 74 will not yet be in their straight-ahead positions. However, once the tractor starts pulling forwardly on the folded machine, castor wheels 104 will react to the ground forces and self-align into the straight-ahead position. Once castor wheels 104 are in their straight-ahead positions, the detent pins 140 (FIG. 5) will snap down into their respective beveled holes 114 to yieldably hold wheels 104 in their straight-ahead positions, thus obviating any tendency for the castor wheels to shimmy during over-the-road travel. Locking bar mechanisms 120 may remain in their unlatched conditions at this time. On the other hand, if cylinders 134 thereof are contracted for any reason, the locking bars 122 will merely engage the peripheral edge of their respective circular plates 110 without slipping into notches 112 because such notches will be out of position at this time. Relief springs 136 provide the ability for the locking bars 122 to simply ride against the edges of plates 110.

To re-establish the machine in its field working position, the operator initially releases manual latch 144 for beams 44, 64 and latches 118 for gauge wheel assemblies 54, 74. Thereupon, swing cylinders 60 and 80 are contracted to commence outward swinging of wing sections 14 and 16, which simultaneously initiates swinging of gauge wheel assemblies 54 and 74 back toward their inboard positions. Once wing sections 14 and 16 have been swung fully to their field positions of FIGS. 1 and 9, the operator may engage inboard latches 114 of gauge wheel assemblies 54, 74 and likewise engage locks 142 for beams 44, 64. Although castor wheels 104 may not be in their straight-ahead positions at this time, upon forward movement of the machine they will react to the ground forces and self-align into such positions. With the latching mechanism cylinders 134 contracted at this time and the locking bars 122 riding along the edge of circular plates 110, bars 122 will eventually snap into notches 112 as notches 112 become aligned with bars 122, hence positively locking castor wheels 104 in their straight-ahead positions. By lowering the machine down to the ground to re-engage the openers or other tools, the machine is ready to commence field operations.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a farm implement having a tool beam swingable from a field position extending transversely of the path of travel of the implement to a folded position generally in line with said path of travel, said beam being supported at least in part by a gauge wheel assembly adjacent an outer end of the beam, the improvement comprising:

said gauge wheel assembly being shiftable around said outer end of the beam from an inboard position when the beam is in its field position to an outboard position when the beam is in its folded position, said gauge wheel assembly including a ground-engaging wheel capable of reacting to ground forces during swinging of the beam for aligning the wheel with the path of travel of the implement in both positions of the beam, said wheel of the gauge wheel assembly having an upright swivel pivot about which the wheel swivels as the wheel reacts to ground forces during swinging of the beam, said swivel pivot being shifted around the outer end of the beam with the gauge wheel assembly when the gauge wheel assembly is shifted between its inboard and outboard positions.

2. In a farm implement as claimed in claim 1, said beam being foldable forwardly from said field position to said folded position.

3. In a farm implement as claimed in claim 1, said wheel being disposed on the front side of the beam with respect to the path of travel of the implement when the beam is in its field position.

4. In a farm implement as claimed in claim 1, said gauge wheel assembly further including a support arm attaching the wheel to the beam, said arm being swingable about an upright axis during shifting between said inboard and outboard positions.

5. In a farm implement as claimed in claim 4, further comprising a hydraulic cylinder operably interconnecting the arm and the beam for effecting said swinging movement of the arm.

6. In a farm implement as claimed in claim 5, further comprising a master hydraulic cylinder for effecting folding and unfolding of the beam, said hydraulic cylinder for the arm being connected to said master cylinder as a slave.

7. In an implement as claimed in claim 1, said beam comprising one of a pair of beams connected to and projecting laterally outwardly in opposite directions from a central wheeled frame section of the implement.

8. In an implement as claimed in claim 7, said implement further comprising a pair of pull bars connected at their rear ends to respective ones of said pair of beams and connected at their front ends to a common hitch device for coupling the implement with a towing vehicle.

9. In an implement as claimed in claim 1, said implement comprising a seeding machine.

10. A farm implement comprising:

a center frame section including a set of ground engaging wheels that support the frame section for over-the-ground travel;

a pair of beams projecting laterally outwardly in opposite directions from said center frame section when the beams are in field positions, said beams being foldable forwardly from said field positions about respective vertical axes into folded positions in which the beams are generally in line with the path of travel of the implement, each of said beams having its own gauge wheel assembly adjacent the outer end of the beam that supports the beam for over-the-ground travel both in the field and folded positions, each of said gauge wheel assemblies including a ground-engaging wheel and a support arm attaching the wheel to the beam, each of said arms being swingable about an upright axis to position its wheel in either an inboard position on the front side of the beam when the beam is in its field position or an outboard position beyond the outer end of the beam when the beam is in its folded position, said wheels being capable of reacting to ground forces during swinging of the beams for aligning the wheels with the path of travel of the implement in both positions of the beams, each gauge wheel assembly including an upright swivel pivot between the arm and the wheel about which the wheel swivels as the wheel reacts to ground forces during swinging of the beam, said swivel pivot shifting around the outer end of the beam with the gauge wheel assembly when the gauge wheel assembly is shifted between its inboard and outboard positions;

hydraulic power devices operably coupled with the beams and with the arms for swinging the beams and arms between their positions; and draft apparatus for pulling the center frame section and the beams along said path of travel when the beams are in their field positions and their folded positions.

11. A farm implement as claimed in claim 10, said central frame section supporting a first set of seeding tools, said beams supporting second and third sets of seeding tools, respectively.

12. A farm implement as claimed in claim 10, said hydraulic power devices including a first master hydraulic cylinder between the center frame section and one of said beams and a first slave cylinder of said first master cylinder between said one beam and the arm of the corresponding gauge wheel assembly, said hydraulic power devices further including a second master hydraulic cylinder between the center frame section and the other of said beams and a second slave cylinder of said second master cylinder between said other beam and the arm of the corresponding gauge wheel assembly.

13. A farm implement as claimed in claim 10, said draft apparatus including a pair of pull bars connected at their rear ends to respective ones of said pair of beams and connected at their front ends to a common hitch device for coupling the implement with a towing vehicle.

14. A farm implement as claimed in claim 10, each of said beams including an inboard section connected to said center frame section by an upright pivot, and an outboard section connected to said inboard section by a horizontal pivot.

15. A farm implement as claimed in claim 14, said draft apparatus including a pair of pull bars connected at their rear ends to the outboard sections of respective ones of said pair of beams and connected at their front ends to a common hitch device for coupling the implement with a towing vehicle, each connection of a pull bar with an outboard section of a beam including a ball swivel.

* * * * *